March 22, 1966 — S. QUISLING — 3,241,203
INTEGRAL FASTENER
Filed May 18, 1964 — 3 Sheets-Sheet 1
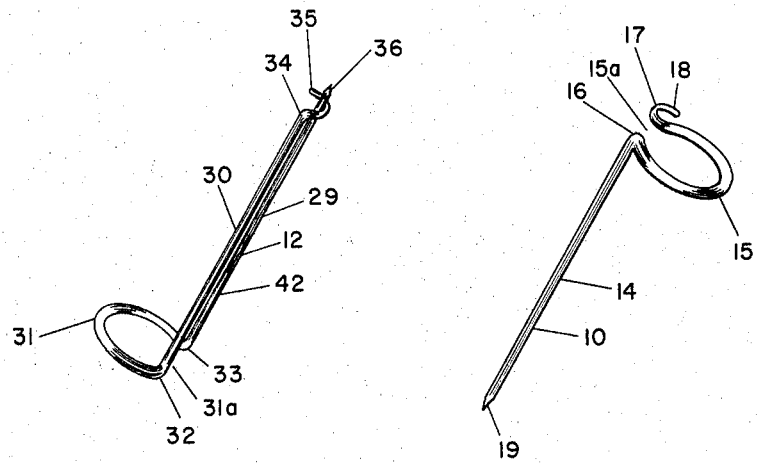
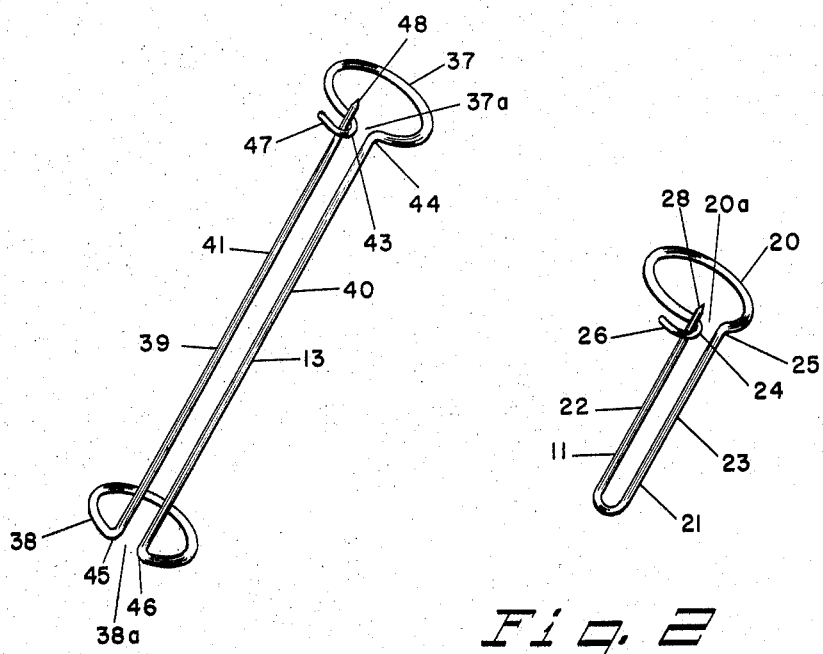
INVENTOR.
SVERRE QUISLING

INVENTOR.
SVERRE QUISLING

United States Patent Office 3,241,203
Patented Mar. 22, 1966

3,241,203
INTEGRAL FASTENER
Sverre Quisling, 1240 Sherman Ave., Madison, Wis.
Filed May 18, 1964, Ser. No. 368,278
6 Claims. (Cl. 24—85)

My invention relates to improvements in the type of integral fastener which may be attached to a flexible material.

One object of my invention is to provide a sturdy, economically constructed integral fastener which is attachable to flexible materials.

Another object of my invention is to provide such a fastener which has loops with openings through which cords or other generally elongated objects may be inserted for securement to the fastener.

A further object of my invention is to provide such a fastener which may be placed in a closed path with other similar fasteners to define a passage of loops through which a draw string may be inserted.

Another object of my invention is to provide such a fastener which in cooperation with other similar fasteners may be used to join the adjacent edges of two pieces of flexible material.

Yet another object of my invention is to provide such a fastener which may be used to hold a flower or a flower vase.

Other objects and advantages of my invention will be readily apparent from the following detailed description taken in conjunction with the accompanying drawings wherein preferred embodiments of the principles of the invention have been selected for exemplification.

In the drawings:

FIG. 1 is a perspective view of one embodiment of my novel fastener.

FIG. 2 is a perspective view of a second embodiment of my fastener.

FIG. 3 is a perspective view of a third embodiment of my fastener.

FIG. 4 is a perspective view of a fourth embodiment of my fastener.

Figure 5:
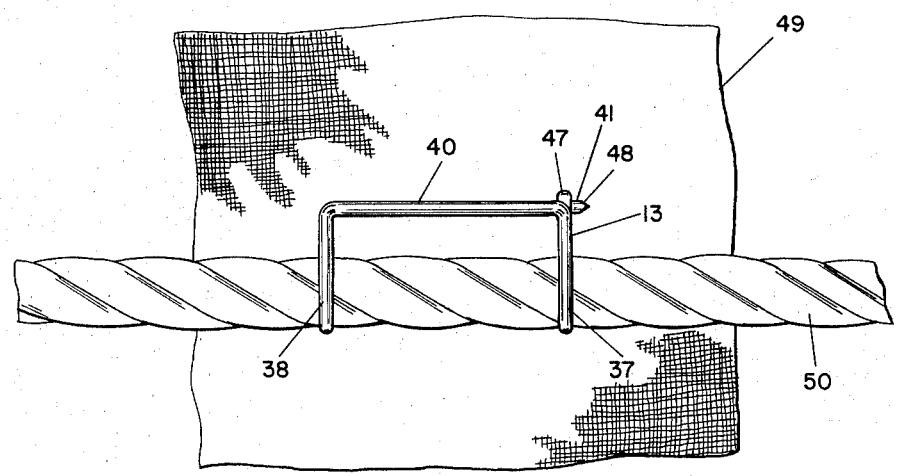
FIG. 5 is a plan view showing how the fastener of FIG. 4 may be used to attach a line to a piece of flexible material.

Each of the fasteners illustrated in FIGS. 1–4 has at least two basic parts consisting of a stem and one or more loops with an opening. Each fastener may be attached to a portion of flexible material by means of its stem. Any cord or generally elongated object may be secured within each fastener by inserting it through the openings in the loops.

The simplest fastener shown is the fastener 10 of FIG. 1. It has a single open loop 15, and a single stem 14. The loop 15 is substantially plane and has a restricted opening 15a defined by ends 16 and 17 of the loop 15. The stem 14 projects from the end 16 in substantially perpendicular relation to the plane of the loop 15. A tip 18 extends from the loop end 17 and curves back toward the loop 15 substantially in the plane of the loop. The free end 19 of the stem 14 is preferably pointed, as shown.

The fastener 11 of FIG. 2 has an open loop 20 and a stem 21. The loop 20 is substantially plane and has a restricted opening 20a defined by ends 24 and 25 of the loop 20. A hook 26 extends from the loop end 24 and curves back toward the loop 20 substantially in the plane of the loop. The stem 21 is a substantially U-shaped element having connected parallel legs 22 and 23. The leg 23 extends from the end 25 of the loop 20 in substantially perpendicular relation to the plane of the loop. The leg 22 is adapted to detachably engage the hook 26, and has a free end 28 which is preferably pointed to facilitate its insertion through the flexible materials to which the fastener 11 will be attached.

The fastener 12 of FIG. 3 has an open loop 31 and a stem portion 42. The loop 31 is substantially plane and has a restricted opening 31a defined by ends 32 and 33 of the loop 31. The stem portion 42 extends from the loop 31 in substantially perpendicular relation to the plane of the loop 31, and comprises the substantially parallel legs 29 and 30. The leg 29 extends from the end 33 of the loop 31 and has a free end 36 which is preferably pointed. The leg 30 extends from the end 32 of the loop 31 and has a free end 34 which curves into a hook 35, the plane of which is substantially parallel to the plane of the loop 31. The free end 36 of the leg 29 is adapted to detachably engage the hook 35, as shown.

The fastener 13 of FIG. 4 has two open loops 37 and 38, and a stem portion 39. The loops 37 and 38 are each substantially plane, and are connected to the stem portion 39 in spaced, substantially parallel relation. The loop 38 has a restricted opening 38a defined by ends 45 and 46 of the loop 38; the loop 37 has a corresponding restricted opening 37a defined by ends 43 and 44 of the loop 37. A hook 47 extends from the loop end 43 and curves back toward the loop 37 substantially in the plane of the loop 37. The stem portion 39 has a pair of substantially parallel legs 40 and 41 which extend between the loops 37 and 38 in substantially perpendicular relation to the substantially parallel planes of said loops. The leg 40 is fixed to the ends 44 and 46 of loops 37 and 38, respectively. The leg 41 is fixed to the end 45 of loop 38, and has a free end 48 which is adapted to detachably engage the hook 47, as shown. Preferably the free end 48 is pointed.

The fasteners 10, 11, 12 and 13 are each adapted to be attached to any flexible material which can be pierced by the pointed ends of the fastener stem portions. A second common functional characteristic of my fasteners is that a cord or other generally elongated object may be easily secured within the loops of the fasteners by one of two methods. The cord or other elongated object may be inserted through the loop (or loops if a double loop fastener or more than one single loop fastener is used) in the same manner as a thread is inserted through the eye of a needle. Another method of inserting a cord or other elongated object, which is particularly well suited for fasteners 10 and 13, is to insert the cord sidewise into the loops through the restricted openings defined by the ends of the loops. My fasteners are preferably made of materials which will permit the loop ends to be forced apart sufficiently to allow the cord to be passed through the enlarged openings into the loop, and which will then return to their original spacing to retain the cord within the loop. The width of the openings between the loop ends will depend upon the size of the object which is desired to be retained within the said loop. The size of the opening is such that the line is substantially prevented from accidentally slipping out of the loop through the openings.

My fasteners have countless uses. One important use for the fastener 13 is suggested by FIG. 5. One or more fasteners 13 may be secured to a section of flexible material 49 with their loops substantially in alignment to form a passage for a draw string. The draw string 50 or cord is secured within a line of the fasteners 13 by either one of the two previously given methods. It will be noted that either described method of securing the cord within the loops of the fastener 13 may be employed while the fastener 13 is secured to the flexible material. The flexible material 49 may be placed over a boat, a car, a piece of outdoor furniture or any other object which must be protected from the weather. The draw string 50 is then secured to the fasteners 13, pulled tight and tied to insure the fullest protection. Locking fasteners 11 and 12, and in some instances fastener 10, may be used in the same manner for the same purpose.

Figure 6:
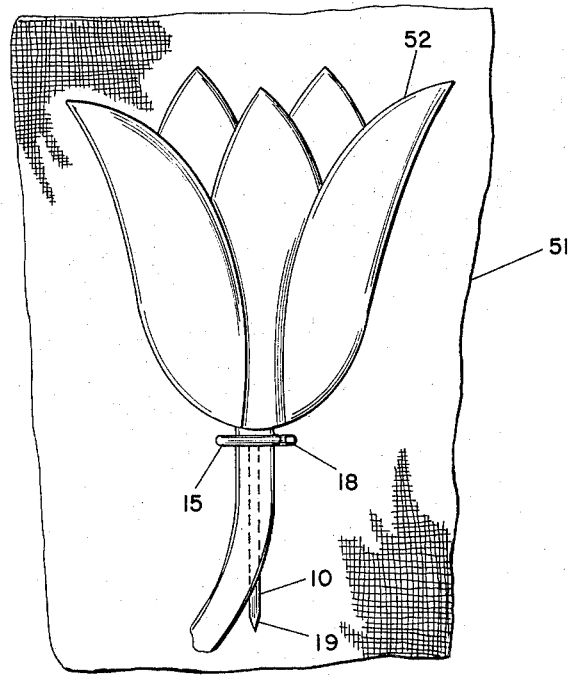
FIG. 6 is a plan view showing how the fastener of FIG. 1 may be used to hold a flower.

The fasteners 11, 12 and 13 are attached to the flexible material 49 in a manner similar to that by which a safety pin is attached to such material. With respect to fastener 13, the leg 41 is disengaged from the hook 47, its pointed end 48 is poked through the flexible material 49 one or more times as shown in FIG. 5, and the leg 41 is then again engaged within the hook 47. The fasteners 11 and 12 are attached to a section of flexible material in the same manner. The fastener 10 is attached to such material in a manner similar to that of a conventional straight pin, as shown in FIG. 6.

Another use for my fasteners is the attachment of flowers or similar decorative objects to clothing or other materials. The fastener 10 is shown performing that function in FIG. 6. The leg 14 acts as a pin for attaching the fastener 10 to the clothing 51. The stem of a flower 52 is then secured within the loop 15 by one of the methods described above. Another possibility is inserting through the loop 15 a narrow flower vase with a flower in it. The function of the out-turned tip 18 is clearly shown by FIG. 6. Because of the out-turning, there is no sharp edge to catch on or tear the clothing 51. Any of the fasteners 11, 12 or 13 may also be used to carry a flower or other such decorative object, if desired, and it will be noted that the hooks 26, 35 and 47, respectively, of said fasteners would in each case curve outward from the material to which the fasteners would be attached to prevent damage to said material.

Figure 7:
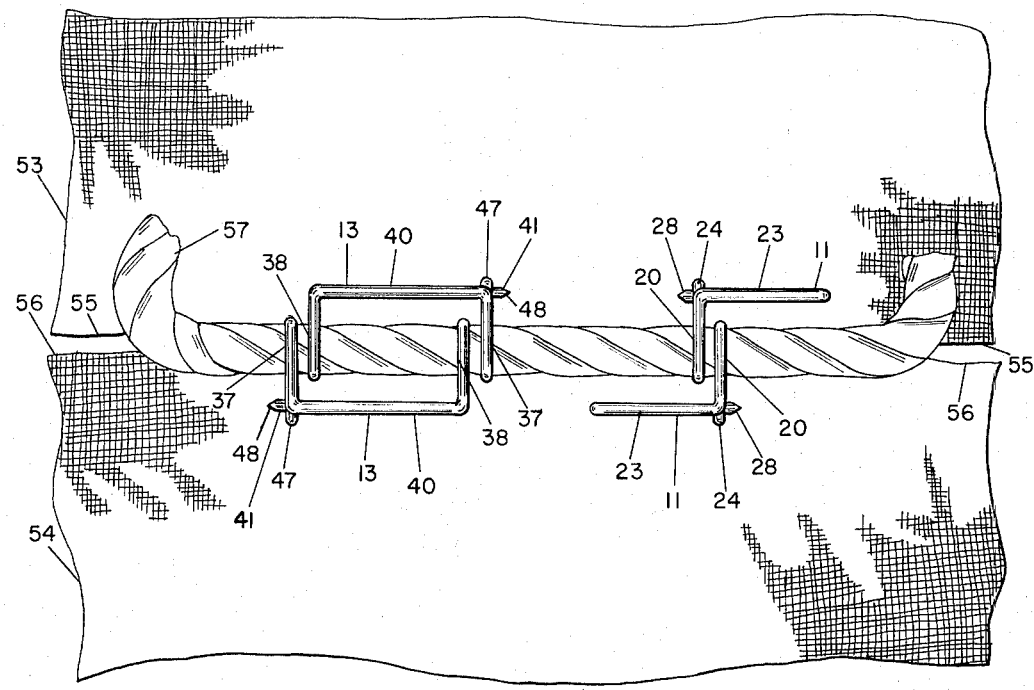
FIG. 7 is a plan view showing how the fasteners of FIGS. 2 and 4 may be used to join the adjacent edges of two pieces of flexible material.

FIG. 7 illustrates the use of the fasteners 11 and/or 13 to join together the adjacent edges 55 and 56 of flexible materials 53 and 54, respectively. The fasteners 11 and/or 13 are preferably attached to the flexible materials 53 and 54 with the planes of their loops substantially perpendicular to the edges 55 and 56 and their loops extending beyond said edges. Preferably, the fasteners are attached to materials 53 and 54 in pairs. One fastener 13 is attached to the material 54, while another fastener is attached to the material 53 at a point such that when the fasteners are connected in close relation by the cord 57 the desired portions of materials 53 and 54 will be fastened together in adjacent relation. Similarly, one fastener 11 is attached to the material 54, while another is attached to the material 53 at a position opposite the fastener 13 attached to material 54. For most effective joinder of the edges 55 and 56, the paired fasteners 13 overlap each other in the manner shown. As an alternative to the illustrated overlapping arrangement, the fasteners 13 may be alternately attached to the materials 53 and 54, one after the other in series, with no overlapping.

As thus connected to the materials 53 and 54, the loops of the fasteners 11 and/or 13 define a passage for a cord 57. The cord 57 is inserted through the loops to complete the joinder of the edges 55 and 56. The fasteners 10 and 12 are also well adapted for the joining of adjacent edges 55 and 56, and may be substituted for either the fasteners 11 or 13.

The fasteners 11 especially may be used to temporarily join the adjacent edges 55 and 56 without the need of a line 57. If a person is sewing a garment of which the edges 55 and 56 are a part, the person may want to try the garment on for size before the edges 55 and 56 are sewn together. This may be easily done by attaching a plurality of the fasteners 11 along each of the edges 55 and 56. The garment may then be placed on a form or model, and the loops 20 of the fasteners 11 attached to one edge hooked into the loops 20 of the adjacent fasteners 11 attached to the other edge. The hooking together of adjacent loops 20 will then temporarily join together the edges 55 and 56.

These specific uses are only suggestive of the many uses to which my fasteners may be put. Broadly, they may be used to attach a cord or an object with a generally elongated section to any flexible material.

Any suitable material may be used to construct my fasteners 10, 11, 12 and 13. A preferred material is wire of a diameter suited to the use for which the fastener is intended. The diameter of the loops and the other dimensions of the fasteners are similarly determined by their intended use. As indicated above, the wire material should preferably have sufficient elasticity so that the fasteners will return to substantially their original shape after the ends of the loops have been spread apart to allow a cord or other object to be secured in said loops, or after the legs 22, 29 and 41 of fasteners 11, 12 and 13, respectively, have been engaged in hooks 26, 35 and 47, respectively.

My fasteners are economically constructed and sturdy. They are as easily manipulated as the ordinary safety pin. They can perform a variety of jobs which no single previously known fastener is capable of performing.

My invention is not confined to the particular arrangement and construction of parts herein illustrated and described but embraces all such modified forms thereof as come within the scope of the following claims.

I claim:
1. An integral fastener comprising:
 (a) a substantially plane loop having first and second ends which define an opening in said loop,
 (b) a hook extending from said loop first end,
 (c) a U-shaped stem portion projecting from said second end of said loop in substantially perpendicular relation to the plane of the said loop, and being adapted to secure said fastener to flexible material,
 (d) said stem portion having a free end adapted to detachably engage said hook,
 (e) said opening in said loop remaining open to facilitate lateral insertion of a line into said loop when said stem portion free end is engaged in said hook, said loop being formed of greater dimension than the line and said opening being formed of less dimension than the line to prevent accidental slipping of the line out of the loop, said fastener being formed from material which will permit the loop ends to be forced apart sufficiently to allow the line to be passed through the enlarged opening into the loop, and which will then return to their original spacing to retain the line within the loop.

2. The invention described in claim 1 wherein said hook extends outward from said loop first end and said loop opening and then back toward said loop in the plane of said loop.

3. An integral fastener comprising:
 (a) a substantially plane loop having first and second ends which define an opening in said loop,
 (b) a hook extending from said loop first end,
 (c) a substantially U-shaped stem portion having a pair of substantially parallel legs extending downwardly in substantially perpendicular relation to the plane of said loop,
 (d) one of said legs projecting from the second end of said loop, the other of said legs being adapted to detachably engage said hook,
 (e) said opening in said loop remaining open to facilitate lateral insertion of a line into said loop when said other of said legs is engaged in said hook, said loop being formed of greater dimension than the line and said opening being formed of less dimension than the line to prevent accidental slipping of the line out of the loop, said fastener being formed from material which will permit the loop ends to be forced apart sufficiently to allow the line to be passed through the enlarged opening into the loop, and which will then return to their original spacing to retain the line within the loop.

4. An integral fastener comprising:
(a) first and second spaced, substantially parallel loops for receiving a line each of said loops having corresponding first and second ends which define corresponding openings in said loops,
(b) a hook extending from the second end of said first loop,
(c) a stem portion comprising first and second substantially parallel legs,
(d) said first leg extending between said loops in substantially perpendicular relation to the plane of said loops, and being fixedly connected to said first ends of said loops,
(e) said second leg extending between said second ends of said loops and having a fixed end connected to the second end of said second loop and a free end,
(f) said free end being adapted to detachably engage said hook,
(g) said opening in said loops remaining open to facilitate the lateral insertion of a line into said loops when said free end of said second leg is engaged in said hook, said loops being formed of greater dimension than the line and said openings being formed of less dimension than the line to prevent accidental slipping of the line out of the loops, said fasteners being formed from material which will permit the loop ends to be fored apart sufficiently to allow the line to be passed through the enlarged openings into the loops, and which will then return to their original spacing to retain the line within the loops.

5. The invention described in claim 4 wherein said hook extends outward from said loop first end and said loop opening and then back toward said loop in the plane of said loop.

6. An integral fastener comprising:
(a) a stem portion comprising a pair of spaced, substantially parallel legs having corresponding first and second ends,
(b) first and second substantially plane loops having corresponding openings for receiving a line, said loops being spaced in substantially parallel relation with the plane of each loop being substantially perpendicular to said legs,
(c) said first loop extending between said first ends of said legs and being fixed thereto,
(d) said second loop being fixed to one of said second ends of said legs and having a hook adapted to detachably engage the other of said second ends,
(e) said openings of said loops remaining open when the other of said second ends is engaged in said hook, said loops being formed of greater dimension than the line and said openings being formed of less dimension than the line to prevent accidental slipping of the line out of the loops, said fasteners being formed from materials which will permit the loop ends to be forced apart sufficiently to allow the line to be passed through the enlarged openings into the loops, and which will then return to their original spacing to retain the line within the loops.

References Cited by the Examiner
UNITED STATES PATENTS

| | | | |
|---|---|---|---|
| D. 26,504 | 1/1897 | Postert. | |
| 237,976 | 2/1881 | Hoffacker | 24—139 |
| 241,201 | 5/1881 | Fautz | 24—6 |
| 393,319 | 11/1888 | Wright | 24—88 |
| 568,269 | 9/1896 | O'Neal | 24—6 |
| 588,659 | 8/1897 | Saario | 24—6 |
| 905,789 | 12/1908 | Brown | 24—12 |
| 1,698,796 | 1/1929 | Holmstrom | 16—87.2 |
| 1,963,824 | 6/1934 | Cassedy | 24—5 |
| 1,965,091 | 7/1934 | Wintrob. | |
| 2,273,368 | 2/1942 | Mumford | 24—6 |

FOREIGN PATENTS 11,550   6/1893   Great Britain.

WILLIAM FELDMAN, *Primary Examiner.*

DONALD A. GRIFFIN, *Assistant Examiner.*